Patented June 17, 1930

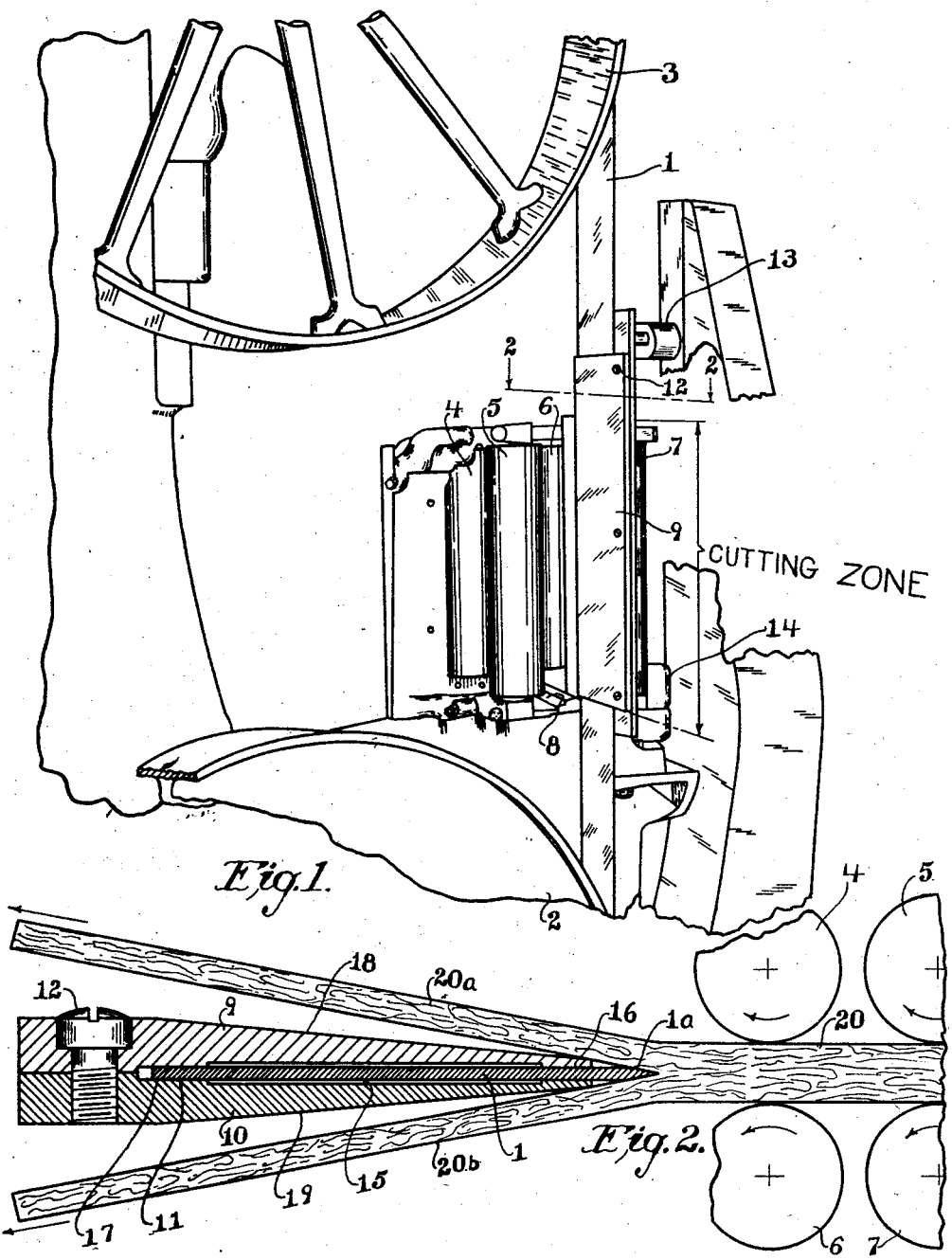

1,764,183

UNITED STATES PATENT OFFICE

GLENN G. RHINEVAULT, OF SAGINAW, MICHIGAN, ASSIGNOR TO W. B. MERSHON CO., OF SAGINAW, MICHIGAN, A CORPORATION OF MICHIGAN

GUIDE FOR BANDSAWS

Application filed March 9, 1928. Serial No. 260,270.

This invention relates to band resaws used for sawing a board to produce two boards of the same length and width, but of less thickness than the original.

Certain machines already in use are well adapted for resawing stock, say, one inch thick, to produce two boards approximately one-half inch thick, or one board slightly thicker than the other.

The present invention adapts such a machine to a greater range of work, for example, it may be used for cutting a number of very thin layers from original stock which is itself unusually thin, say, several veneered strips one-sixteenth inch successively from a board one-half inch thick.

Band resaws as heretofore constructed, whether equipped with toothed cutting edges or with knife edges devoid of teeth, can not be used satisfactorily on such very thin material because of the tendency of the cutting band to lead or weave into the work more or less at one side or the other of the theoretical cutting line, thereby producing resawn material that is not of uniform thickness. A small amount of such weaving action is not of much consequence when thick work is being sawn, as in the ordinary use of a band resaw, but is fundamentally objectionable when very thin work is to be resawn to produce unusually thin material.

As is well known, an ordinary band resaw travels between saw guides that are located respectively above and below the space which is occupied by the work where it contacts with the saw. This space I shall term for the purpose of this description the cutting zone. In its travel through this cutting zone the band is unsupported, permitting the weaving tendency above mentioned.

An object of my invention is, therefore, to provide a two-piece guiding device for bandsaw blades whereby material, originally quite thin, can be resawn without danger of objectionable weaving. With this device a cutting band, either knife-edges or toothed, is enabled to produce resawn material that is very thin yet accurate and uniform.

With the foregoing and certain other objects in view, which will appear later in the specifications, my invention comprises the devices described and claimed and the equivalents thereof.

In the drawings Fig. 1 is a perspective view of the feeding and cutting mechanism of a band resaw to which my improvement is attached.

Fig. 2 is an enlarged sectional view on the line 2—2 of Fig. 1, showing the band with its cutting device and a piece of material being resawn.

In the drawings only so much of the bandsaw mechanism has been illustrated as is necessary to explain the construction and mode of operation of my present improvement as applied thereto.

Numeral 1 designates the cutting blade considered for purposes of description as a steel band having a sharp knife edge devoid of teeth. Numerals 2 and 3 designate respectively the lower and upper band wheels for actuating the blade, the wheels being power-driven in the customary way.

The work-forwarding device preferably consists of a pair of feed rolls 4, 5 arranged to operate against one side of the work, and another pair 6 and 7 opposed to 4 and 5, as is usual in band resaws. Numeral 8 designates the work-supporting table.

The improved blade supporting and guiding device which forms the principal subject matter of my invention constitutes in effect a stationary sheath of new and useful construction through which the blade 1 travels. This sheath extends from the work table, and encloses the blade, except its front cutting edge which protrudes from the front edge of the sheath.

Referring to Fig. 2 the guide or sheath is seen to consist of two plates 9 and 10, their inner faces shaped to provide a channel 11 for saw 1. The plates 9 and 10 are secured along their back edges preferably by screws or bolts 12 and the upper and lower ends of the sheath are fixed to stationary supports 13, 14 on the frame of the machine. The inner faces of the channel walls 11 are relieved by being recessed at 15 so as to leave the principal area of the band free. Along its front or working edge 1ª the blade is also supported by a pair of guide surfaces or ways 16, and along its rear edge the blade is supported by a similar pair of opposed ways 17.

The exterior faces 18 and 19 of the sheath plates 9 and 10 are preferably arranged to flare outwardly from the cutting edges of the blades in the manner previously noted and as shown in Fig. 2, constituting a spreading device of wedge-shaped cross section that extends through the full height of the cutting zone directly in the path of the material being resawn. In some places only one of the blades 9 and 10, as the case may be, is required to flare, instead of both, as shown in Fig. 2.

The work 20 is forwarded to the cutting band 1 in the direction indicated by the arrows in Fig. 2 by means of feed rolls 4, 5, 6, 7. The cutting edge 1ª of the band severs the work 20, and the spreading apart of the two resawn thin pieces 20ª and 20ᵇ is done independently of the saw band by the separating action of the plates 9 and 10. The cutting edge 1ª is permitted to do its work freely, yet there is no chance for it weaving or working out of its theoretical cutting line. The band is guided throughout the entire height of its cutting zone by the two upright ways formed on the faces of plates 9 and 10, one located directly back of the cutting edge 1ª at 16, and the other along a strip 17 at the rear edge of the blade, the middle part of the blade being out of contact with the plates 9 and 10, as indicated at 15.

By the means above described a new capacity has been imparted to a band resaw. Whereas it has heretofore been possible to resaw only relatively thick work it is now feasible to resaw unusually thin material, the finished work being comparable to veneer in thickness, yet accurate as to gauge and strong by reason of the fact that the resawing operation as performed by the machine of this invention does not impose any unnecessary stresses upon the material.

Having thus described my invention, what I claim and desire to secure by Letters Patent is:

A guide for a cutting band comprising a stationary sheath consisting of two plates secured together face to face, their inner faces formed with a channel the thickness of which corresponds to the thickness of the band, the walls of said channel recessed lengthwise the sheath to present guideways along the front edge of the sheath and a similar pair of guideways along its rear edge, the working faces of both guideways being uninterrupted throughout their length.

In testimony whereof I affix my signature.

GLENN G. RHINEVAULT.